US011934153B2

(12) United States Patent
Helfer et al.

(10) Patent No.: US 11,934,153 B2
(45) Date of Patent: Mar. 19, 2024

(54) MECHANICAL HOROLOGICAL BEARING PROVIDED WITH A DAMPING

(71) Applicant: ETA SA MANUFACTURE HORLOGÈRE SUISSE, Grenchen (CH)

(72) Inventors: Jean-Luc Helfer, Landeron (CH); Sylvain Huot-Marchand, Eschert (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 298 days.

(21) Appl. No.: 17/162,404

(22) Filed: Jan. 29, 2021

(65) Prior Publication Data

US 2021/0263473 A1 Aug. 26, 2021

(30) Foreign Application Priority Data

Feb. 26, 2020 (EP) .................................... 20159595

(51) Int. Cl.
*G04B 31/012* (2006.01)
*G04B 31/02* (2006.01)

(52) U.S. Cl.
CPC ......... *G04B 31/0123* (2013.01); *G04B 31/02* (2013.01)

(58) Field of Classification Search
CPC ..... G04B 31/02; G04B 31/0123; G04B 31/04
See application file for complete search history.

(56) References Cited

U.S. PATENT DOCUMENTS

2014/0328150 A1* 11/2014 Boulenguiez .......... G04B 17/26 29/896.31
2019/0094808 A1* 3/2019 Le Fèvre ............ F16C 33/3806
2020/0301368 A1* 9/2020 Hurni ................... G04B 47/044

FOREIGN PATENT DOCUMENTS

| | | | |
|---|---|---|---|
| CH | 244 128 | A | 8/1946 |
| CN | 109557799 | A | 4/2019 |
| EP | 3 418 595 | A1 | 12/2018 |
| EP | 3 460 275 | A1 | 3/2019 |
| JP | 2002-311161 | A | 10/2002 |
| JP | 2007-309480 | A | 11/2007 |
| JP | 2019-70642 | A | 5/2019 |

OTHER PUBLICATIONS

Dynalloy, Introduction to Nitinol, Mar. 2018, https://web.archive.org/web/20180319093324/https://www.dynalloy.com/nitinol.php.*
European Search Report for EP 20 15 9595 dated Aug. 22, 2020.

* cited by examiner

*Primary Examiner* — renee s luebke
*Assistant Examiner* — Matthew Hwang
(74) *Attorney, Agent, or Firm* — Sughrue Mion, PLLC

(57) ABSTRACT

A mechanical horological bearing (1) intended to be arranged on a mechanical timepiece movement (10), the bearing (1) including, coaxial around a common rotation axis (D), at least one internal frame (4) and at least one external frame (5) forming a running track (20), as well as a plurality of wheels (12) sliding or rolling in the running track (20), during a relative movement between the internal frame (4) and the external frame (5) that guides them and wherein at least one of the internal frame (4) and external frame (5) is a dynamic frame, at least one structural part of the bearing (1) being produced from an elastic metal material with a high damping capacity, the damping factor of which is greater than 10%, preferably greater than 30%.

12 Claims, 2 Drawing Sheets

MECHANICAL HOROLOGICAL BEARING PROVIDED WITH A DAMPING

CROSS-REFERENCE TO RELATED APPLICATION

This application claims priority to European Patent Application No. 20159595.6 filed Feb. 26, 2020, the entire contents of which are incorporated herein by reference.

FIELD OF THE INVENTION

The invention relates to a mechanical horological bearing provided with a damping part.

The invention also relates to a horological movement including such a bearing.

The invention relates to the field of horological mechanisms and more particularly rotational guides.

BACKGROUND OF THE INVENTION

Mechanical watches with automatic winding are generally provided with oscillating winding masses for winding the barrel spring. In order to allow the pivoting of the oscillating mass, use is usually made of a ball bearing as a suspension.

The components of a bearing are usually metallic, in particular steel, brass or copper-beryllium alloy.

However, such ball bearings generate noises in the form of acoustic waves, which may be a nuisance for the wearer of the watch. The origin of these noises is diverse, in particular because of the roughness of the contacts between the bodies, shape defects on manufacture or due to wear on the bodies by friction.

In order to solve this problem, it has been sought, for example in the application EP 3460275, to reduce the contact surfaces between the balls and the other bodies of the bearing. However, such a bearing requires a large quantity of lubricant, the viscosity of which is higher, which may limit the winding capacity. The lubricant is also visible from the outside of the watch, which may cause unpleasant unaesthetic effects.

SUMMARY OF THE INVENTION

The aim of the invention is to propose a mechanical bearing, in particular a ball bearing, which avoids the aforementioned problems.

To this end, the invention relates to a mechanical horological bearing intended to be arranged on a mechanical movement of a timepiece, the bearing including, coaxial around a common rotation axis, at least one internal frame and at least one external frame forming a running track, as well as a plurality of wheels sliding or rolling in the running track, during a relative movement between the internal frame and the external frame that guide them and wherein at least one of said internal frame and external frame is a dynamic frame.

The invention is remarkable in that at least one structural part of the bearing is produced from an elastic metal material with high damping capacity, the damping factor of which is greater than 10%, preferably greater than 30%.

By virtue of such a bearing, the vibrations due to the movement of the oscillating mass are significantly attenuated. Thus, wearing a watch with automatic winding does not give rise to any unpleasant sensation, in particular on the wrist.

Furthermore, the use of a metal material makes it possible to avoid the problems of damping in synthetic materials, such as the absorption of moisture and the release of gas. In addition, a metal material has higher quality and is more noble in a luxury timepiece, and is generally much stronger.

According to a particular embodiment of the invention, the metal material has a tensile strength greater than 100 MPa, preferably greater than 400 MPa, or even 600 MPa.

According to a particular embodiment of the invention, the material is to be chosen from the following list:

- an alloy of manganese at at least 80%, and copper,
- an alloy of copper at at least 80%, preferably at 82%, and of aluminum and nickel, preferably at 12% and 5%,
- an alloy of iron at at least 80%, preferably at 85%, and of chromium and aluminum, preferably at 12% and 3%,
- an alloy of iron at at least 60%, preferably at 65%, and of cobalt, preferably at 35%,
- an alloy of iron at at least 90%, preferably at 95%, and of aluminum and carbon, preferably at 6% and 0.2%,
- an alloy of manganese at at least 70%, preferably at 73%, and of copper, nickel and iron, preferably at 20%, 5% and 2%, the alloy having a Vickers hardness number of at least 130, and
- an alloy of the Nitinol type comprising nickel at at least 50%, preferably at 55%, and titanium, preferably at 45%.

According to a particular embodiment of the invention, the bearing comprises a first damping piece intended to be positioned between one of said frames and a bridge of the automatic winding system of the movement, the first damping piece forming a part of the bearing produced from an elastic metal material with a high damping capacity.

According to a particular embodiment of the invention, the bearing comprises a second damping piece intended to be positioned between one of said frames and means for holding the bearing on the movement, such as a nut or a screw, the second damping piece forming the part of the bearing produced from an elastic metal material with a high damping capacity.

According to a particular embodiment of the invention, the first and/or the second piece are washers.

According to a particular embodiment of the invention, the first and/or second piece are tubes.

According to a particular embodiment of the invention, the external frame is produced from a damping material.

According to a particular embodiment of the invention, the internal frame is produced from a damping material.

According to a particular embodiment of the invention, said wheels are balls produced from a metal material with a high damping capacity.

The invention also relates to a horological movement including such a bearing.

BRIEF DESCRIPTION OF THE DRAWINGS

Other features and advantages of the invention will emerge from a reading of the following detailed description, with reference to the accompanying drawings, where.

DETAILED DESCRIPTION OF PREFERRED EMBODIMENTS

Figure 1:
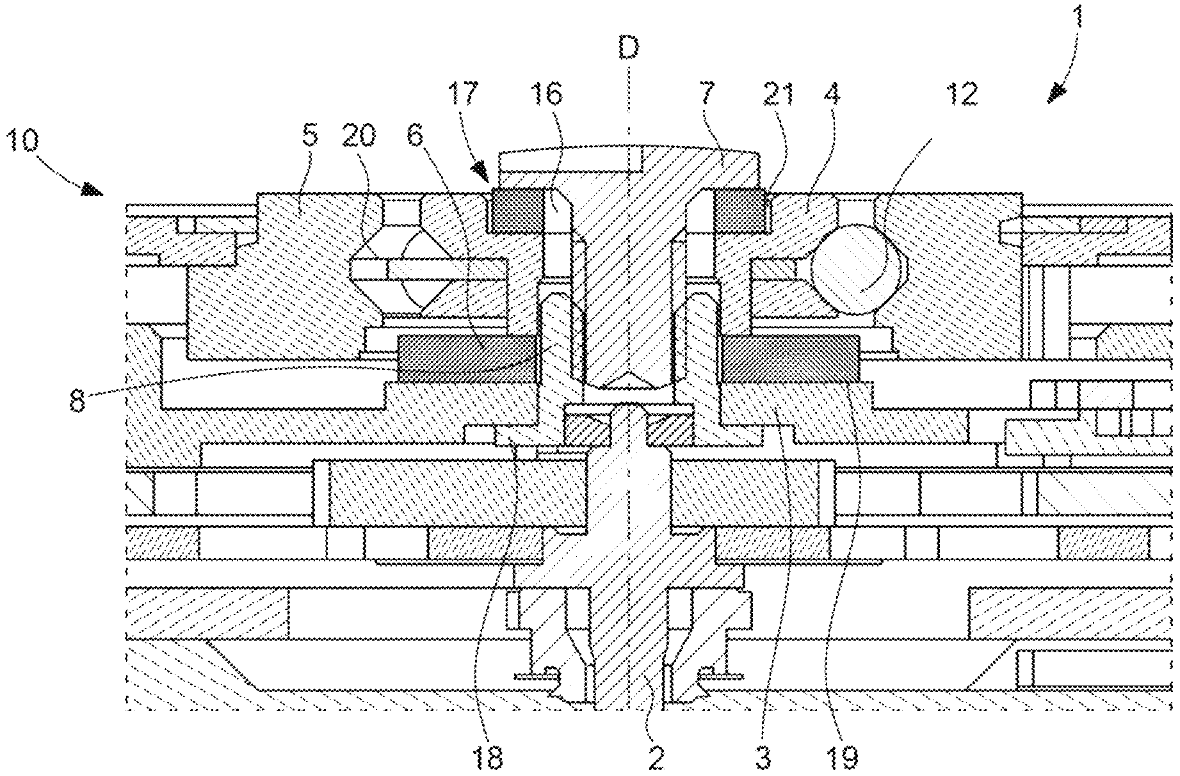
FIG. 1 shows schematically a view in cross section of a part of a mechanical movement with automatic winding, the movement being provided with a ball bearing according to a first embodiment of the invention.
Figure 2:
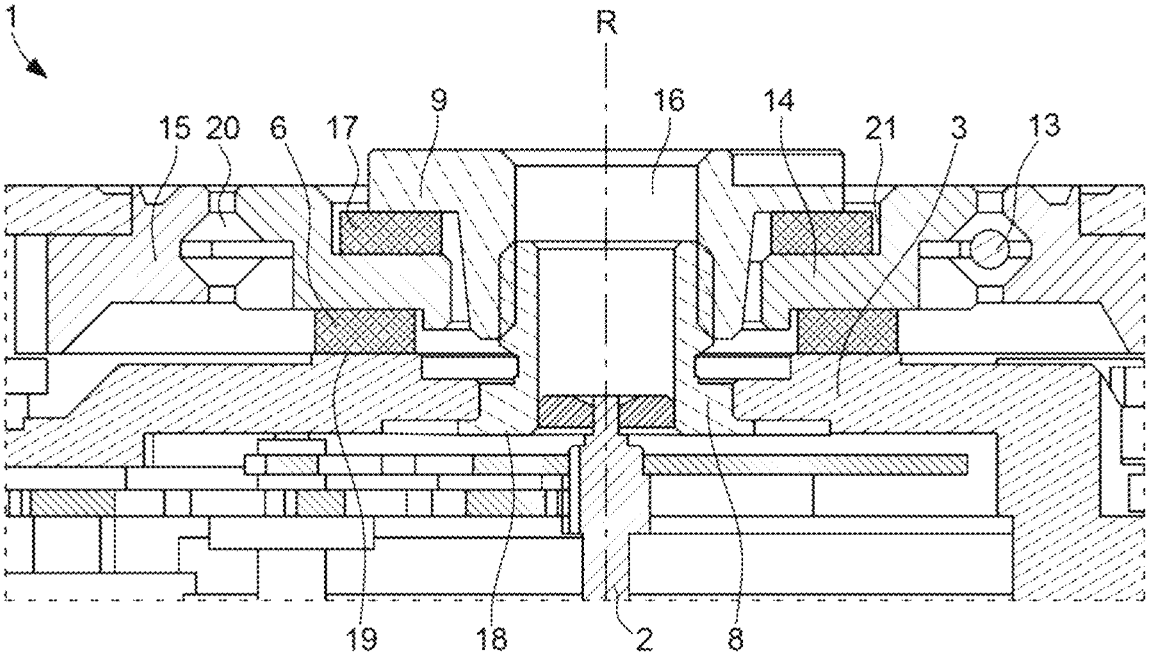
FIG. 2 shows schematically a view in cross section of a part of a mechanical movement with automatic winding, the movement being provided with a ball bearing according to a variant of the first embodiment of the invention.

The invention relates to a mechanical bearing 1 with automatic winding for a horological movement 10, for example as shown in FIGS. 1 and 2.

In FIGS. 1 and 2, the movement 10 comprises an arbor 2 fora display system with hands, an automatic-winding system bridge 3 on which various gear trains and movement elements 10 are assembled, as well as a ball bearing 1 fixed to the bridge 3 of the automatic-winding system by holding means, such as a screw 7 in FIG. 1 and a nut 9 in FIG. 2.

This bearing 1 includes, conventionally, coaxial around a common rotation axis D, at least one internal frame 4, 14 and at least one external frame 5, 15. The arbor 2 of the display system with hands and the axis D are colinear, the arbor 2 of the display system being assembled on the other side of the bridge with respect to the bearing 1.

Assembled, these internal 4, 14 and external 5, 15 frames form a running track 20, wherein a plurality of wheels 12, 13, here balls, slide or roll in a relative movement between the internal frame 4, 14 and the external frame 5, 15. The running track 20 is an internal rolling conduit, which holds the wheels 12, 13, while enabling them to move in the conduit.

The invention is illustrated in the figures in the simplified case of a single internal frame 4, 14 and a single external frame 5, 15, a person skilled in the art can extrapolate it to a bearing including a plurality of stages, each of which includes a running track 20 for wheels 12, 13 between an internal frame 4, 14 and an external frame 5, 15. The external frame 5, 15 is formed by a single external race. Naturally the external frame 5, 15 may also be composed of a plurality of juxtaposed external races.

The bearing 1 is assembled on the bridge 3. In FIG. 1 or 2, the mechanical bearing 1 comprises an axial central passage 16 for passage of the screw 7 and nut 9. The screw 7 is screwed into a stud 8 held by a collar 18 under the bridge 3 of the winding system, while the nut 9 is screwed around the stud 8. The screw 7 or the nut 9, as well as the stud 8, are disposed on the axis D of the bearing 1. The stud 8 is inserted in the passage 16 under the ball bearing 1, while the screw 7 or the nut 9 is inserted in the passage 16 over the top of the bearing 1.

In such a stage including a running track 20, at least the internal frame 4, 14, or the external frame 5, 15, is a dynamic frame, that is to say it is movable during the normal functioning of the bearing compared with a static component of a horological movement, such as a plate, bridge 3, or similar. In a particular variant that is not illustrated, the internal frame 4, 14, is a dynamic frame and the external frame 5, 15 is a dynamic frame. In another variant illustrated by FIG. 2, the internal frame 4, 14 is a static frame, and the external frame 5, 15 is a dynamic frame. In yet another variant that is not illustrated, the internal frame is a dynamic frame, and the external frame 5, 15 is a static frame.

Such bearings 1 are designed for horological applications, and because of this have very small dimensions:

diameter between 1.6 mm and 20.2 mm, bounds included;
diameter of the balls when the wheels are balls, between 0.2 mm and 0.6 mm, bounds included;
thickness of the internal frame 4, 14 in the direction of the rotation axis between 0.4 mm and 1.5 mm, bounds included, and less than or equal to 1.0 mm when the wheels are balls with a diameter of between 0.2 and 0.6 mm, bounds included;
thickness of the external frame 5, 15 in the direction of the rotation axis between 0.4 mm and 1.5 mm, bounds included, and less than or equal to 1.0 mm when the wheels are balls with a diameter of between 0.2 m and 0.6 mm, bounds included.

More particularly, the smallest bearings have balls with a diameter of 0.2 mm, for a diameter of 1.6 mm the thicknesses thereof are between 0.4 and 1 mm.

And the largest bearings have balls with a diameter up to 0.6 mm, for a diameter of 5.7 to 20.2 mm the thicknesses thereof range up to 1.5 mm.

The bearing 1 illustrated in FIG. 1 or 2 is a ball bearing according to the invention, with a diameter of 5.7 mm, a ball diameter of 0.5 mm, a thickness of the internal frame of 1.0 mm, and a thickness of the external frame of 1.0 mm.

According to the invention, at least one structural part of the bearing 1 is produced from an elastic metal material with a high damping capacity, the damping factor of which is greater than 10%, preferably greater than 30%. Structural part means a part of the bearing that is different from the wheels or balls, such as the frames or a damping piece for example. The wheels or balls may of course also be made from this same material, but in addition to a structural part of the ball bearing.

In the first embodiment in FIGS. 1 and 2, the bearing 1 comprises a first damping piece 6 positioned between the internal frame 4, 14 and the bridge 3 of the automatic winding system. The first piece 6 is arranged on a disk 19 of the bridge of the automatic winding system. The bearing 1 furthermore comprises a second damping piece 17 positioned between the internal frame 4, 14 and the means for holding the bearing 1 on the movement 10, that is to say the screw 7 or the nut 9. The second piece 17 is arranged in a bed 21 hollowed out in the top face of the internal frame 4, 14. The damping pieces are washers, or flat disks, provided with a central opening allowing passage of the screw, of the nut or of the stud according to the arrangement thereof. The second piece is smaller than the first, since the screw or the nut is narrower. The damping pieces are concentric around the axis of the bearing.

Figure 3A:
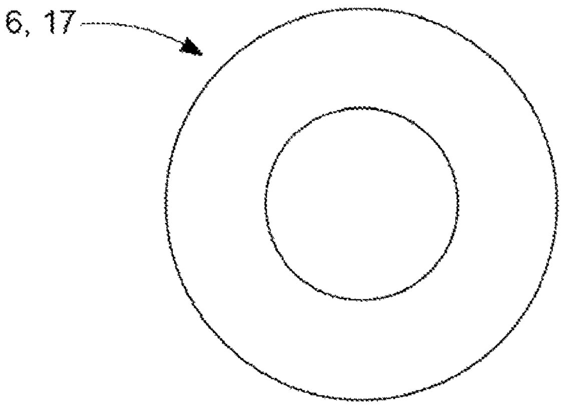
FIG. 3 shows schematically a damping piece in the form of a washer and a damping piece in the form of a tube.
Figure 3B:
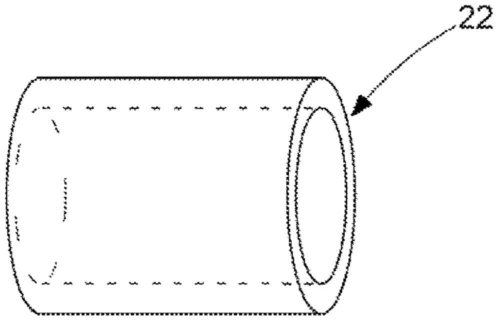

FIG. 3 shows a damping piece 6, 7 of the first embodiment, which is in the form of a washer. A damping piece 22 in the form of a tube is also shown. The tubes are hollow elongate pieces arranged in a similar manner to the washers. Tubes may in fact be used for absorbing the vibrations according to another embodiment.

The damping pieces 6, 17, 22 are produced from an elastic metal material with a high damping capacity, the damping factor of which is greater than 10%, preferably greater than 30%. Such a damping factor affords sufficient comfort for the wearer of the timepiece. Thus these damping pieces absorb the vibrations generated by the ball bearing 1.

In dynamic mechanical analysis, a body is subjected to a strain or to an oscillatory deformation. The damping factor 8, also referred to as the loss factor, characterized by the damping capacity of a material according to the following equation:

$$\delta = \frac{Ediss}{Emax};$$

where Ediss is the energy dissipated by the material during an oscillation cycle, and Emax is the maximum deformation energy stored by the material during an oscillation cycle.

The metal material is preferably to be chosen from the following list:

- an alloy of manganese at at least 80%, and of copper,
- an alloy of copper at at least 80%, preferably 82%, and of aluminum and nickel, preferably at 12% and 5%,
- an alloy of iron at at least 80%, preferably at 85%, and of chromium and aluminum, preferably at 12% and 3%, such as the commercial alloy "Silentalloy",
- an alloy of iron at at least 60%, preferably at 65%, and of cobalt, preferably at 35%, such as the commercial alloy "Gentalloy",
- an alloy of iron at at least 90%, preferably at 95%, and of aluminum and carbon, preferably at 6% and 0.2%,
- an alloy of manganese at at least 70%, preferably at 73%, and of copper, nickel and iron, preferably at 20%, 5% and 2%, such as the commercial alloy "M2052", the alloy having a Vickers hardness number of at least 130, and
- an alloy of the Nitinol type comprising nickel at at least 50%, preferably at 55%, and titanium, preferably at 45%.

However, other metal materials are also possible, in particular alloys having the same physical properties, in particular concerning the damping factor.

The materials of the M2052 type or of the Nitinol type are particularly well suited to damping pieces, such as the washers or tubes described above. Nitinol has in particular shape-memory and superelasticity qualities.

Furthermore, the metal material has a tensile strength greater than 100 MPa, preferably greater than 400 MPa, or even 600 MPa. Thus the part of the bearing is stronger, and wears less quickly, than with other materials. Damping materials made from polymer, as described in the application EP 3418595, have a much lower modulus of elasticity, so that a clearance may occur between the ball bearing and the bridge. Such a clearance may give rise to contacts between the bearing and the bridge, or other components of the movement.

Figure 4:
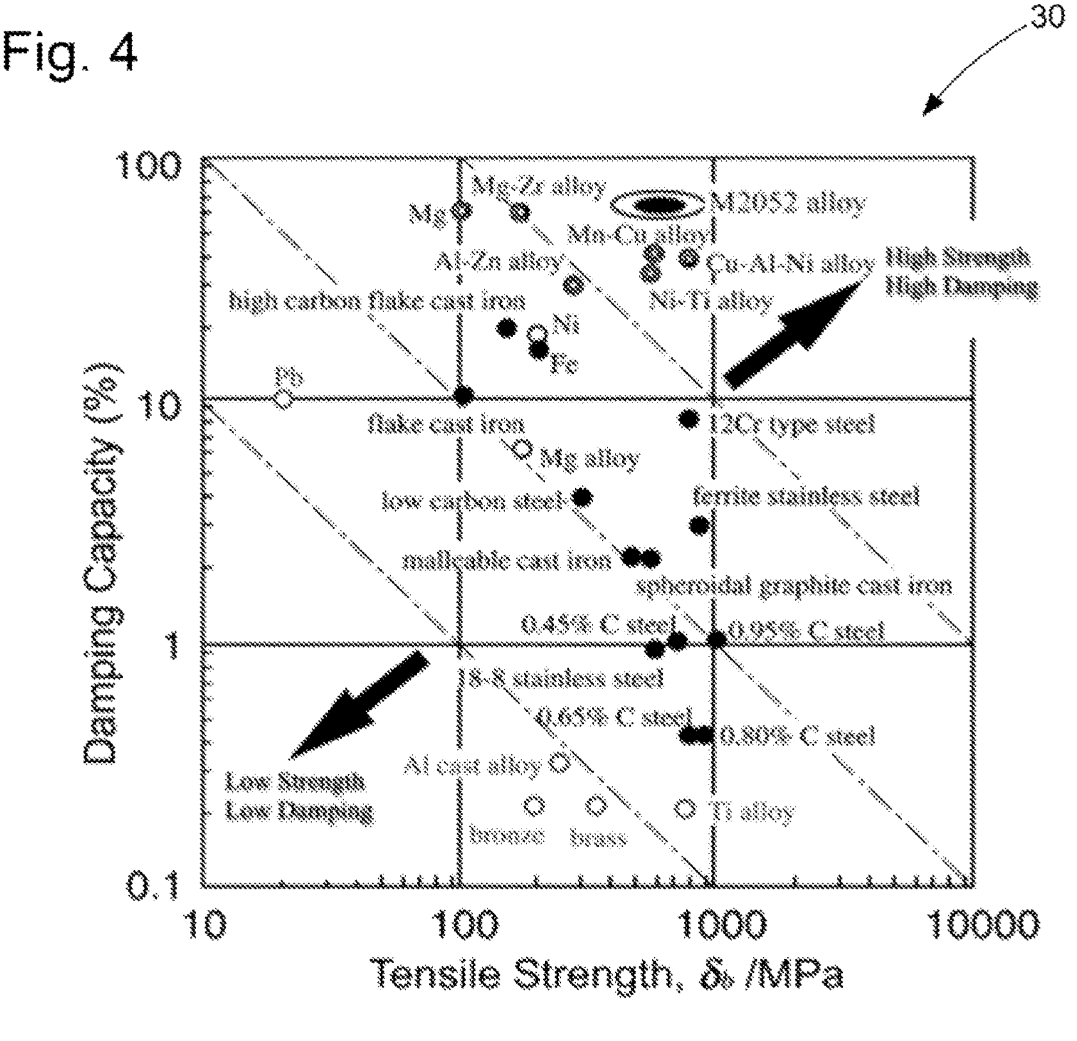
FIG. 4 is a graph showing a damping factor of certain materials and alloys as a function of the tensile strength of the materials, this graph having been published in the article "Development and application of high damping alloys for noise and vibration control" (ICSV 14, 9-12 Jul. 2007, Cairns AU) by F. Yin.

FIG. 4 shows a graph 30 wherein damping factor values as a function of the tensile strength of metal materials are shown. The alloys mentioned above have both a high damping factor, above 10%, or even 30%, and a high tensile strength, above 100, or even 600 MPa.

The embodiments shown relate to damping pieces. However, it is possible to obtain damping with other components of the bearing.

More generally, according to the invention, at least part of the bearing is produced from an elastic metal material with a high damping capacity, the damping factor of which is greater than 10%, preferably greater than 30%.

In a second embodiment, not shown in the figures, the part made from metal material is one of the frames of the ball bearing. In a variant, the two frames are formed from this metal damping material. The geometry of the bearing must be adapted in order to avoid stresses and contact pressures.

In a third embodiment, not shown in the figures, said wheels are balls produced from a metal material with a high damping capacity. Materials of the Nitinol type are particularly well suited to producing such balls.

The invention also relates to a horological movement 10 including at least one bearing 1 as described above.

The invention claimed is:

1. A mechanical horological bearing configured to be arranged on a mechanical timepiece movement, the bearing including, coaxial around a common rotation axis, at least one internal frame and at least one external frame-forming a running track, as well as a plurality of wheels sliding or rolling in the running track, during a relative movement between said internal frame and said external frame that guides them, wherein at least one of said internal frame and external frame is a dynamic frame, wherein at least one structural part of the bearing is produced from an elastic metal material with a high damping capacity, the damping factor of which is greater than 10%, wherein the bearing comprises a first damping piece configured to be positioned entirely flatly between one of said frames and a bridge of the automatic winding system of the movement, the first damping piece forming the part of the bearing produced from an elastic metal material with a high damping capacity.

2. The mechanical bearing according to claim 1, wherein the metal material has a tensile strength greater than 100 MPa.

3. The mechanical bearing according to claim 1, wherein the material is to be chosen from the following list:

- an alloy of manganese at at least 80%, and copper,
- an alloy of copper at at least 80%, and of aluminum and nickel at 12% and 5%,
- an alloy of iron at at least 80%, and of chromium and aluminum at 12% and 3%,
- an alloy of iron at at least 60%, and of cobalt, at 35%, an alloy of iron at at least 90%, and of aluminum and carbon at 6% and 0.2%,
- an alloy of manganese at at least 70%, and of copper, nickel and iron at 20%, 5% and 2%, and
- an alloy of the Nitinol type comprising nickel at at least 50%, and titanium at 45%.

4. The mechanical bearing according to claim 1, wherein the bearing comprises a second damping piece positioned between one of said frames and means for holding the bearing on the movement, the second damping piece forming the part of the bearing produced from an elastic metal material with a high damping capacity, and wherein a radius of the second damping piece is less than that of the first damping piece.

5. The mechanical bearing according to claim 1, wherein the first damping piece is a washer.

6. The mechanical bearing according to claim 1, wherein the first damping piece is a tube.

7. The mechanical bearing according to claim 1, wherein the external frame is produced from the damping material.

8. The mechanical bearing according to claim 1, wherein the internal frame is produced from the damping material.

9. The mechanical bearing according to claim 1, wherein said wheels are balls produced from a metal material with a high damping capacity.

10. A horological movement including at least one bearing according to claim 1.

11. The mechanical bearing according to claim 4, wherein the second damping piece is a washer.

12. The mechanical bearing according to claim 1, wherein the second damping piece is a tube.

* * * * *